J. CROMWELL.
COFFEE-POT.

No. 187,107. Patented Feb. 6, 1877.

Witnesses.
Michael Ryan
Fred. Haynes

John Cromwell
by his Attorneys
Brown & Allen

UNITED STATES PATENT OFFICE.

JOHN CROMWELL, OF CRANFORD, NEW JERSEY.

IMPROVEMENT IN COFFEE-POTS.

Specification forming part of Letters Patent No. 187,107, dated February 6, 1877; application filed December 9, 1876.

*To all whom it may concern:*

Be it known that I, JOHN CROMWELL, of Cranford, in the county of Union and State of New Jersey, have invented an Improvement in Coffee-Pots; and I do hereby declare that the following is a full, clear, and exact description of the same, reference being had to the accompanying drawing, which forms part of this specification.

My invention is an improvement on my invention of a coffee-pot for which an application for Letters Patent was filed February 9, 1876, and which was allowed June 23, 1876.

The invention has for its object the carrying out, in a more simple and effective manner than in my former invention, above referred to, of the principle of extracting the virtues of coffee by steeping the same in boiling water, and at the same time condensing the volatile matters extracted from the solid coffee in cooler water than that which extracts such volatile matters.

This invention consists in a reticulated or perforated diaphragm, placed and held below the outlet-opening of the pot, and retaining and holding the solid coffee in the bottom part of the pot in a stratum of boiling water, while the volatile ingredients extracted from the coffee rise into cooler water above the diaphragm, and are there condensed and retained until poured from the pot. The interruption of general circulation caused by the diaphragm and retained coffee below it causes the water in the lower chamber to boil for a considerable time previous to the boiling of the water above the diaphragm, which has been demonstrated by experiment.

The invention further consists in combining with a coffee-pot a reticulated or perforated diaphragm, strengthened by a band and arms, and having a vertical rod below the outlet-opening of the pot, and prevented from an upward movement by means of the rod, the object and functions of which will be fully hereinafter described.

Figure 1:
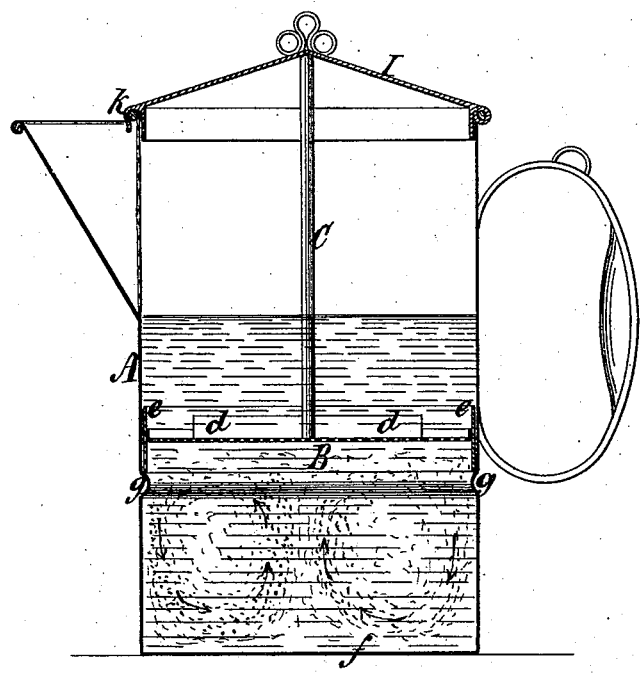
Figure 2:
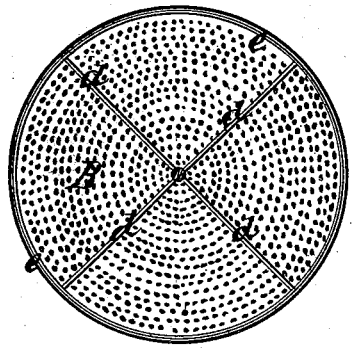

Figure 1, in the accompanying drawing, is a central vertical section of a coffee-pot comprising my improvement. Fig. 2 is a plan view of the perforated or reticulated retaining-diaphragm.

A represents the body of the pot, and B the perforated or reticulated diaphragm placed therein. The diaphragm B is preferably attached to a rod, C, and strengthened by radial arms $d$ and a rim, $e$, said rim extending a short distance above and below the said diaphragm. The diaphragm is preferably supported, at a proper distance above the bottom $f$ of the pot, upon a ledge, $g$, formed on the interior of the body A. It is prevented from being forced upward by accumulation of steam under it by the rod C, which rises from the central part of the said diaphragm, and abuts against the under side of the cover I of the pot, said cover being provided with a spring-catch, $k$, to hold the same closed; or other suitable means of holding down the diaphragm may be used. The diaphragm B performs two functions: It serves to hold the coffee in the bottom of the pot, and prevent its rising into the clear liquor above the diaphragm, and, aided by the coffee retained below it, it so interferes with the circulation of the heated water as to divide such water into two strata, the lower, or one below the diaphragm, boiling and continuing to boil for some time before the stratum above the said diaphragm is heated to the boiling-point. The upper and cooler stratum of water condenses the volatile matters extracted from the coffee, which pass through the diaphragm into the cooler water, whereas if the diaphragm were not interposed the circulation of the water in the pot would constantly carry these heated volatile matters to the top of the pot before they were cooled, and they would immediately escape into the air and be lost.

I thus accomplish by the simple retaining-diaphragm all the good results attained by the hollow containing-diaphragm described in the specification accompanying the above-cited application, allowed to me June 23, 1876, and in a more efficient manner; for, whereas in my former invention the solid coffee was only partially interpenetrated by the upper portion of the boiling water below it, in my present invention the coffee mingles freely with the boiling stratum of water below the diaphragm and circulates with it, thus facilitating the extraction of the soluble matters.

I claim—

1. The combination, with a coffee-pot, of a single perforated or reticulated retaining-diaphragm, held below the outlet-opening of the pot, extending entirely across the pot, and dividing the pot into a lower extracting-chamber for the reception of the solid coffee, and an upper condensing-chamber for the reception, condensation, and retention of volatile extracts, said chamber communicating only through the perforations or reticulations in said diaphragm, substantially as and for the purpose specified.

2. The combination, with a coffee-pot, of the reticulated diaphragm B, strengthened by band and arms or flanges, substantially as described, and having a vertical rod, C, said diaphragm being arranged below the outlet-opening of the pot, and prevented from an upward movement by means of the vertical rod, as and for the object set forth.

JOHN CROMWELL.

Witnesses:
 BENJAMIN W. HOFFMAN,
 FRED. HAYNES.